US009019905B2

(12) United States Patent
Kazmi et al.

(10) Patent No.: US 9,019,905 B2
(45) Date of Patent: Apr. 28, 2015

(54) UPLINK INTERFERENCE REDUCTION AT BASE STATION WITH RESTRICTED WIRELESS ACCESS

(75) Inventors: Muhammad Kazmi, Bromma (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/142,683

(22) PCT Filed: Apr. 28, 2011

(86) PCT No.: PCT/SE2011/050517
§ 371 (c)(1),
(2), (4) Date: Jun. 29, 2011

(87) PCT Pub. No.: WO2012/096604
PCT Pub. Date: Jul. 19, 2012

(65) Prior Publication Data
US 2014/0036786 A1     Feb. 6, 2014

Related U.S. Application Data

(60) Provisional application No. 61/431,624, filed on Jan. 11, 2011.

(51) Int. Cl.
| H04L 5/00 | (2006.01) |
| H04W 52/14 | (2009.01) |
| H04W 52/24 | (2009.01) |
| H04W 24/10 | (2009.01) |
| H04W 28/04 | (2009.01) |

(52) U.S. Cl.
CPC .......... *H04L 5/0062* (2013.01); *H04W 52/146* (2013.01); *H04W 52/244* (2013.01); *H04W 52/247* (2013.01); *H04W 24/10* (2013.01); *H04W 28/048* (2013.01); *H04W 52/245* (2013.01)

(58) Field of Classification Search
USPC ............ 370/252, 318–337; 455/69, 522, 63.1
See application file for complete search history.

(56) References Cited

U.S. PATENT DOCUMENTS

| 2008/0175185 A1* | 7/2008 | Ji et al. .......................... 370/318 |
| 2009/0092059 A1* | 4/2009 | Fu ................................. 370/252 |

(Continued)

FOREIGN PATENT DOCUMENTS

| CN | 101267443 | 9/2008 |
| WO | WO 2009/055619 | 4/2009 |
| WO | WO 2009/120121 | 9/2009 |

OTHER PUBLICATIONS

International Search Report and Written Opinion of the International Searching Authority mailed Jul. 25, 2011 in corresponding Application No. PCT/SE2011/050517.

(Continued)

*Primary Examiner* — Vincelas Louis
(74) *Attorney, Agent, or Firm* — Baker Botts, LLP

(57) ABSTRACT

According to a particular embodiment, a method in a macro base station of a heterogeneous wireless communication system, includes reducing uplink interference at a radio base station with restricted wireless access. The uplink interference is caused by a user equipment served by the network node, which has a restricted wireless access to the radio base station. The method comprises receiving measurement reports from user equipments served by the network node, and identifying a user equipment causing uplink interference at the radio base station among the user equipments, based on the received measurement reports. The method also comprises obtaining information relating to a total uplink received interference from the radio base station via the identified user equipment, and adjusting a transmit power, a transmission activity, and/or a scheduling of the identified user equipment based on the obtained information, such that the uplink interference caused by the identified user equipment is reduced.

16 Claims, 11 Drawing Sheets

(56) References Cited

U.S. PATENT DOCUMENTS

2009/0109939 A1* 4/2009 Bhushan et al. ............. 370/337
2009/0318152 A1 12/2009 Maheshwari

OTHER PUBLICATIONS

Universal Mobile Telecommunications System (UMTS); FDD Home Node B (HNB) Radio Frequency (RF) requirements (FDD) (3GPP TS 25.967 version 9.0.0 Release 9, Feb. 1, 2010, XP014044979.

NTT Docomo et al, Study on Enhanced Interference Management Mechanism for HNB, 3GPP Draft, R3-091894, 3GPP Draft Mobile Competence Centre, Aug. 20, 2009, XP050353254.

International Search Report and Written Opinion of the International Searching Authority mailed Nov. 25, 2011 in corresponding Application No. PCT/SE2011/05058.

EPO Communication pursuant to Article 94(3) EPC for Application No. 11 722 604.3-1855 Jul. 2, 2014.

* cited by examiner

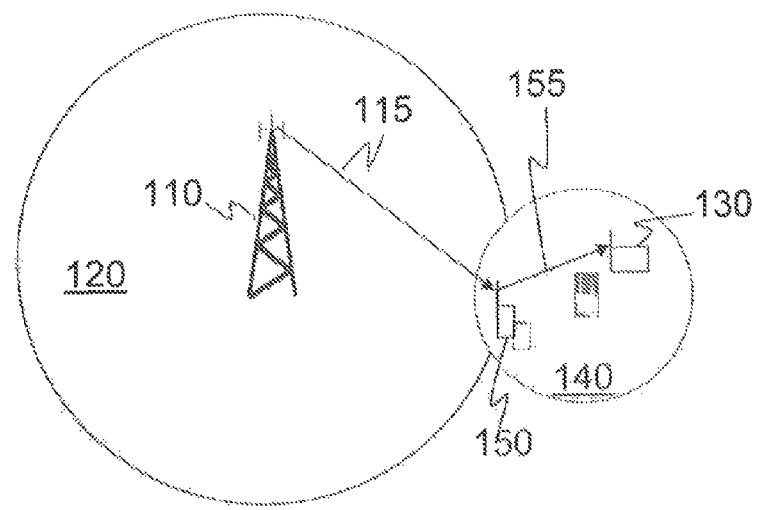
Fig. 1  - Prior Art -
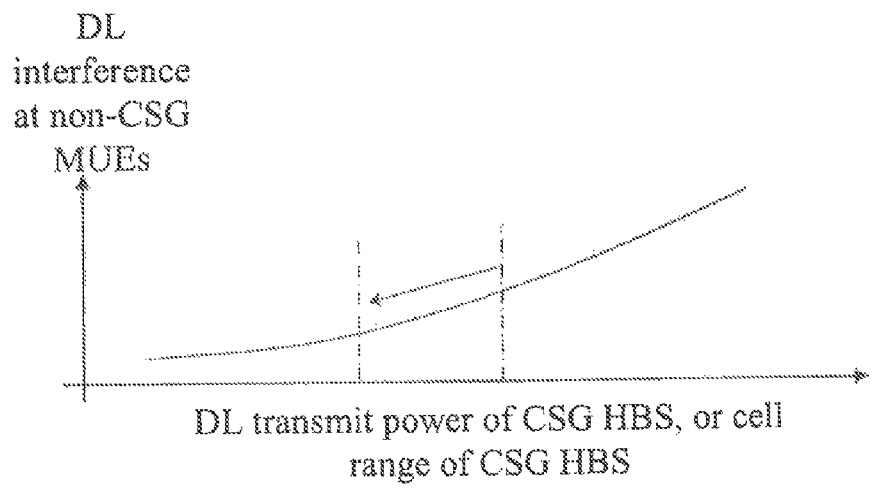
Fig. 2a

UPLINK INTERFERENCE REDUCTION AT BASE STATION WITH RESTRICTED WIRELESS ACCESS

PRIORITY

This nonprovisional application is a U.S. National Stage Filing under 35 U.S.C. §371 of International Patent Application Serial No. PCT/SE2011/050517, filed Apr. 28, 2011, and entitled "UPLINK INTERFERENCE REDUCTION AT BASE STATION WITH RESTRICTED WIRELESS ACCESS" and U.S. Provisional Patent Application No. 61/431,624 filed Jan. 11, 2011, both of which are hereby incorporated by reference in their entirety.

TECHNICAL FIELD

The technology relates to heterogeneous wireless communication systems, and in particular, to uplink interference reduction. More particularly, the technology relates to a network node, a radio base station with restricted wireless access, and a user equipment, and to a method for reducing uplink interference at the radio base station with restricted wireless access, where the uplink interference is caused by the user equipment served by the network node and with a restricted wireless access to the radio base station.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a user equipment (UE) is wirelessly connected to a radio Base Station (BS) commonly referred to as a NodeB and an evolved NodeB (eNodeB) respectively. Each BS serves one or more areas referred to as cells.

In E-UTRAN, Orthogonal Frequency Division Multiple Access (OFDMA) technology is used in the downlink and single carrier frequency division multiple access (SC-FDMA) in the uplink. In both uplink and downlink the data transmission is split into several sub-streams, where each sub-stream is modulated on a separate sub-carrier. Hence in OFDMA based systems, the available bandwidth is sub-divided into several resource blocks (RB). A resource block is defined in both time and frequency. According to the current assumptions in the 3GPP standard, a resource block size is 180 KHz and 0.5 ms in the frequency and time domains respectively. The overall uplink and downlink transmission bandwidth may be as large as 20 MHz per frequency carrier.

According to the 3GPP definition, a heterogeneous network comprises two or more layers, where the layers are served by different types of BSs or BS classes. In a two-layered macro-femto heterogeneous network the macro cell layer and femto cell layer typically comprise macro BS and Home BS (HBS), respectively. FIBS are radio BSs with restricted wireless access, as will be explained later. In co-channel heterogeneous networks, all layers operate on the same carrier frequency.

Hitherto, three LTE BS classes are specified: wide area or macro BS, local area or pico BS, and HBS. Nonetheless additional BS classes such as medium range BS may be introduced in the future. The BS classes differ in that they have different levels of maximum output power and associated minimum coupling loss. Some other requirements such as frequency error and receiver sensitivity may also differ for different BS classes as they are generally optimized for specific deployment scenarios. In LTE, the maximum output power of a local area BS which serves a pico cell, and a HBS which serves a femto cell, is 24 dBm and 20 dBm respectively, when Multiple Input Multiple Output (MIMO) is not applied. For E-UTRAN FDD and E-UTRAN TDD, the HBS maximum output power, $P_{f, max, antenna}$, is 17 dBm per antenna port in case of two transmit antennas, or 14 dBm per antenna port in case of four transmit antennas, and so forth. A formula for the HBS maximum output power is given by a general formula according to the following:

$$P_{f,max,antenna} = 20\ \text{dBm} - 10 * \log 10(N)$$

where N is the number of transmit antenna ports at the HBS. Similar scaling is also used for the maximum output power of the pico BS when MIMO is used. The maximum output power of the macro BS is declared by the manufacturer, and may typically be between 43 and 46 dBm. BS power classes or types similar to those specified for LTE are also specified in UTRAN.

A heterogeneous network may enhance capacity in dense traffic areas or hotspots, i.e. small geographical areas with a higher user density and/or higher traffic intensity. Heterogeneous networks may also be used for coverage extension. However, heterogeneous network deployments and in particular the co-channel scenario also bring challenges for which the network has to be prepared to ensure efficient network operation and superior user experience.

The heterogeneous network may constitute of BS employing any one or a mix of technologies such as LTE, High Speed Packet Access (HSPA), GSM, and CDMA2000. There are several frequency bands which have been standardized for multiple technologies, e.g., band 1 at 2 GHz for LTE and HSPA, and band 3 at 1800 MHz for GSM, LTE and HSPA. Hence heterogeneous deployment may even comprise of mixture of technologies. Another example scenario comprises BS that are a mixture of single radio access technology BSs and multi-standard radio (MSR) type BSs.

A HBS, sometimes also called a femto BS, typically serves private premises or small office environments. Another main characteristic of the HBS is that it is typically owned by a private subscriber who has the liberty to install it at any location. The subscriber's operator may also own the HBS, but the location of the HBS may not be fixed. The subscriber may e.g. move the HBS from one part of the house to another. Thus strict network planning may not be possible or may be challenging in case of HBS deployment. This is different from other BS classes which are deployed by an operator according to some well defined principles.

An access control mechanism for the HBS decides if a given UE may or may not connect to that HBS. The selection of the access control mechanism has a large impact on the performance of the overall network, mainly due to its role in the definition of interference. in UTRAN and E-UTRAN, the concept of Closed Subscriber Groups (CSG) exists. According to CSG, only a subset of UEs, defined by the owner of the HBS, may wirelessly access or connect to that particular HBS. Hence wireless access for other UEs is denied by the CSG based HBS.

FIG. 1 illustrates a part of a heterogeneous network mixing macro cells 120 served by macro nodes 110, and cells operating as CSG cells 140 served by HBSs 130. The macro node 110 may be a macro BS, and the HBS 130 may be a home eNodeB in an LTE network. In the illustrated scenario, a macro UE (MUE) 150 which is camped on, connected to, or served by the macro node 110, which is illustrated by the arrow 115, is close to the strong CSG HBS(s) 130. However, the MUE may not be allowed to be served by the CSG cell 140, as the CSG cell 140 has restricted access for certain UEs. The CSG cell 140 may thus be regarded as a non-allowed HBS 130 from this MUE 150 point of view. In this situation, the MUE 150, called the aggressor MUE, may cause significant uplink interference to the HBS 130, which is illustrated by the arrow 155, as the MUE 150 is operating close to the victim HBS 130. The HBS 130 may be referred to as the victim HBS.

Another problem is the downlink interference from the HBS 130 towards the MUE 150. The HBS may be required to lower its maximum output power, i.e. to adjust its downlink power settings, in order to protect the downlink reception quality of the MUE operating in an adjacent carrier frequency. The HBS maximum output power may also need to be adjusted in the co-channel deployment scenario, i.e. when the macro node and the HBS operate on the same carrier frequency. The adjustment of the maximum output power of the HBS to protect the MUEs downlink quality can be ensured by specifying certain requirements for the HBS in the standard. For such a co-channel scenario, i.e. a victim downlink MUE and an aggressor downlink HBS, there are currently no such requirements on HBS. However in near future these requirements are expected to be defined in the standard for LTE HBS. The HBS maximum output power adjustment techniques enable the MUE to operate close to the CSG cells, as the MUE is able to receive downlink signals from its serving macro node with a relatively reduced interference from the HBS.

The downlink maximum output power adjustment, sometimes also called a downlink maximum output power setting algorithm, is thus designed to protect MUEs, and in particular those MUEs that are not allowed to access the CSG cell. The downlink maximum output power adjustment may be used not only for reducing the transmit power, but also to expand the coverage area of a cell such as the CSG cell, or more specifically to restore the maximum HBS coverage when there are no non-CSG MUEs in close vicinity any longer. If no MUEs suffer from high downlink interference from the HBS any longer, the HBS coverage area may be restored to its maximum again.

The side effect with the HBS maximum output power adjustment, making it possible to shrink the HBS coverage and therefore increase the coverage of the macro cells, is that some UEs may change serving cell due to the adjustment. The HBS coverage shrinking results in that some of the UEs belonging to the CSG cell, hereinafter referred to as Home UEs (HUE), may have to be served by the macro node instead. The consequences of this are that:

1. The macro node may have to transmit at a higher power in the downlink to avoid a coverage hole. This may further degrade the downlink reception quality of the HUEs and the MUE.
2. The new cell edge MUEs of the macro cell, which increased its coverage due to the shrinking of CSG cell coverage, are now located close to the HBS and possibly also far away from the new serving macro node. These new cell edge MUEs will therefore likely transmit at a relatively higher power level in the uplink than they would have done as HUEs in the CSG cell if no CSG coverage shrinking was performed. The uplink interference experienced at the HBS is therefore increased, thus deteriorating the uplink reception quality. This will in particular impact the uplink reception quality of the HUEs which may already be experiencing high interference from the non-CSG MUEs.

SUMMARY

One fundamental problem is that the CSG HBS typically does not have means to directly control or limit the uplink interference from the MUEs or from other UEs which are not under its control. Furthermore, the downlink maximum output power adjustment that is used for protecting MUEs from downlink interference from HBS, may result in bad uplink interference conditions for the HBS. If the downlink maximum output power adjustment requirements are too strict and do not take into account the potential degradation of the uplink performance, the reduction of BS downlink maximum output power may lead to constantly poor uplink performance of HUEs in a CSG cell. If the HBS maximum downlink power is for example inadequately reduced, the presence of a few MUEs which are non-CSG UEs may severely degrade or even potentially block the HBS uplink reception performance for CSG HUEs.

An object is therefore to address some of the problems and disadvantages outlined above, and to allow a macro network node to reduce an uplink interference at a victim radio base station with restricted wireless access, where the uplink interference originates from an aggressor UE that does not have access to the victim radio base station and that is served by the other macro network node. At the same time, an acceptable level of downlink interference from the victim radio base station to UEs that do not have access to it should be ensured.

In accordance with an embodiment, a method in a network node of a heterogeneous wireless communication system, for reducing uplink interference at a radio base station with restricted wireless access is provided. The uplink interference is caused by a user equipment served by the network node, wherein the user equipment has a restricted wireless access to the radio base station. The method comprises receiving measurement reports from one or more user equipments served by the network node, and identifying a user equipment causing uplink interference at the radio base station among said one or more user equipments, based on the received measurement reports. The method also comprises obtaining information relating to a total uplink received interference from the radio base station via the identified user equipment, and adjusting at least one of a transmit power, a transmission activity, and a scheduling of the identified user equipment based on the obtained information, such that the uplink interference caused by the identified user equipment is reduced.

In accordance with another embodiment, a method in a radio base station with restricted wireless access of a heterogeneous wireless communication system, for supporting a reduction of uplink interference at the radio base station caused by a user equipment served by a network node of the wireless communication system is provided. The user equipment has a restricted wireless access to the radio base station. The method comprises determining a total uplink received interference at the radio base station based on a triggering event, and transmitting information relating to the determined total uplink received interference to the user equipment, to support the reduction of uplink interference performed by the network node.

In accordance with still another embodiment, a method in a user equipment of a wireless communication system, for supporting a reduction of uplink interference caused by the user equipment at a radio base station with restricted wireless access of the wireless communication system is provided. The user equipment is served by a network node of the wireless communication system and has a restricted wireless access to the radio base station. The method comprises acquiring information relating to a total uplink received interference from the radio base station based on a triggering event, and transmitting the acquired information to the network node, to support the reduction of uplink interference performed by the network node.

In accordance with a further embodiment, a network node configured to be used in a heterogeneous wireless communication system is provided. The network node is also configured to reduce uplink interference at a radio base station with restricted wireless access, the uplink interference being caused by a user equipment served by the network node, and the user equipment having a restricted wireless access to the radio base station. The network node comprises a receiver configured to receive measurement reports from one or more user equipments served by the network node, and a processing unit configured to identify a user equipment causing uplink interference at the radio base station among said one or more user equipments, based on the received measurement reports. The processing unit is also configured to obtain information relating to a total uplink received interference from the radio base station via the identified user equipment, and adjust at least one of a transmit power, a transmission activity, and a scheduling of the identified user equipment based on the obtained information, such that the uplink interference caused by the identified user equipment is reduced.

In accordance with another embodiment, a radio base station with restricted wireless access configured to be used in a heterogeneous wireless communication system is provided. The radio base station is also configured to support a reduction of uplink interference at the radio base station caused by a user equipment served by a network node of the wireless communication system, the user equipment having a restricted wireless access to the radio base station. The radio base station comprises a processing unit configured to determine a total uplink received interference at the radio base station based on a triggering event, and a transmitter for transmitting information relating to the determined total uplink received interference to the user equipment, to support the reduction of uplink interference performed by the network node.

In accordance with another embodiment, a user equipment configured to be used in a wireless communication system, and to support a reduction of uplink interference caused by the user equipment at a radio base station with restricted wireless access of the wireless communication system, is provided. The user equipment is configured to be served by a network node of the wireless communication system and to have a restricted wireless access to the radio base station. The user equipment comprises a processing unit configured to acquire information relating to a total uplink received interference from the radio base station based on a triggering event, and a transmitter configured to transmit the acquired information to the network node, to support the reduction of uplink interference performed by the network node.

An advantage of particular embodiments is that the network node may control the uplink interference in a neighboring radio base station with restricted wireless access without requiring any backhaul communication between the radio base station and the network node.

BRIEF DESCRIPTION OF THE DRAWINGS

FIG. 1 illustrates schematically a part of a heterogeneous network with macro cells and CSG cells.

FIGS. 2a-c illustrate the relation between downlink/uplink interference and transmit power adjustment decisions in a CSG HBS.

DETAILED DESCRIPTION

Figure 2B:
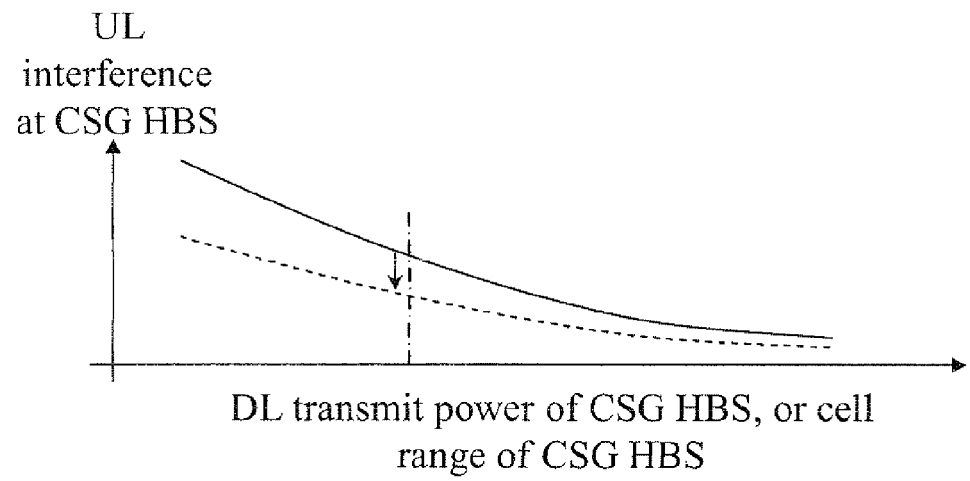

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures. Those skilled in the art will appreciate that the functions of those blocks and/or of described nodes/functionalities may be implemented using hardware circuitry (e.g., analog and/or discrete logic gates interconnected to perform a specialized function, or ASICs) and/or using software programs and data in conjunction with one or more digital microprocessors or general purpose computers. Nodes that communicate using the air interface also have suitable radio communications circuitry. Moreover, the technology may additionally be considered to be embodied entirely within any form of computer-readable memory, such as solid-state memory, magnetic disk, or optical disk containing an appropriate set of computer instructions that would cause a processor to carry out the techniques described herein.

Embodiments are described herein by way of reference to particular example scenarios. Particular aspects are described in a non-limiting general context in relation to heterogeneous deployment in LTE and in particular to enhanced Inter Cell Interference Coordination (eICIC) for LTE. In eICIC advanced techniques such as time domain sharing of resources between different heterogeneous layers, e.g., between macro BSs and pica BSs, are used to mitigate interference in a co-channel deployment scenario. However since what is disclosed may apply to any technology or mixture of technologies, the generic terms Macro network Node (MN) and HBS are used below. The term MN represents a network node which may be a macro BS or a macro controller or both. However, in the literature other terminologies such as wide area BS or general purpose BS are also interchangeably used for the macro BS. The logical entity or the node representing the macro BS is called macro or wide area eNodeB in LTE. In HSPA the corresponding term is macro or wide area NodeB. In HSPA the MN functionalities may also reside in a Radio Network Controller (RNC) controlling the NodeBs or partly in RNC and partly in Node B. In GSM, the MN may be a Base Transceiver Station (BTS), i.e. the BS in GSM, and/or a Base Station Controller (BSC). More generally, MN may also refer to a higher-power class BS, and a pico BS may e.g. also be viewed as a general MN.

Home eNodeB, home NodeB, femto BS, home BTS, indoor relay, indoor access point, and any type of BS which is barred to ordinary subscribers are also specific examples of the HBS. The person skilled in the art may appreciate that these different terminologies refer to the same type of radio BS. Hereinafter, the terms Home UE (HUE) and Macro UE (MUE) denote UEs which are camped on, connected to, or served by the HBS and the MN, respectively.

As described earlier a CSG HBS allows access to only a subset of UEs belonging to the CSG, which are selected by an owner of the CSG HBS. The generic term HBS cell also covers hybrid HBS or hybrid CSG HBS. A hybrid CSG HBS provides all services to its member UEs but in addition also provides selected services to the UEs which are not CSG members. The non-CSG may also be offered services with lower priority compared to those offered to the CSG members. An example of a service which may be provided to the non-CSG UE is paging. This means a non-member CSG UE may receive paging message from a hybroid CSG HBS. A hybrid CSG HBS may even provide data services to non-member CSG UEs. However, the major difference between hybrid and CSG HBS cells is that CSG HBS cells provide no service to non-CSG UEs, whilst hybrid cells provide some service, though limited in at least some aspects. Regardless of the services offered, the hybrid HBS is like the HBS not likely to support an interface to the macro network nodes. in the context of LTE e.g., the X2 interface between a hybrid CSG HeNB and macro eNB is not likely to exist. Furthermore, the hybrid HBS could like the normal HBS be deployed by the owner of the HBS without proper network planning.

This disclosure relates to the reduction of the uplink interference at a HBS with restricted wireless access in a heterogeneous network deployment, while ensuring, at least in some embodiments, an acceptable level of downlink interference to UEs that are not allowed to access the HBS. There is thus also a need to relate the mechanisms of reducing the uplink interference to the downlink maximum output power adjustments performed to protect other-cell UEs in the downlink. Such mechanisms are also a part of the current invention.

In particular embodiments, the serving MN is enabled to:
Detect that the uplink interference caused by at least one MUE towards at least one neighbouring BS with restricted access, e.g., a non-allowed CSG HBS, exceeds a threshold;
Reduce the uplink interference towards the restricted-access BS by performing at least one or more of the following actions in the detected MUE:
Reduce the MUE transmit power below a threshold;
Allocate a limited number of physical channels, e.g., allocate a number of resource blocks (RB) in LTE, where the number is below a certain threshold;
Change the MUE Radio Resource Control (RRC) state from connected to idle;
Change the MUE state from non-Discontinuous Reception (DRX) to DRX;
Extend the MUE DRX cycle if DRX is used;
Extend the MUE inactivity or the Discontinuous Transmission (DTX) level;
Restore one or more of the above parameters to a normal or default level either after a certain time TO or when the uplink interference level caused by the MUE towards the neighbouring BS falls below a certain threshold.

In the disclosure, embodiments are described with reference to a typical example scenario for illustration purposes. In the example scenario a heterogeneous network with two cell layers is deployed. The heterogeneous network comprises a layer of radio BS or network nodes with restricted access, which in this example scenario is a layer of CSG HBS, and one layer of MN with non-restricted access, which in this example scenario is a layer of macro BS. The restricted access to the HBS means that only certain subscribers are allowed to wirelessly access the HBS. In principle this may apply to any type of BS including also macro BS. However the most common scenario is as described earlier that of the CSG based HBS.

The technology in this application applies to any type of heterogeneous network with at least one restricted network node. However the practical scenario is that of the two-layered heterogeneous network consisting of MN with unrestricted access and HBS with restricted access, although more than two layers are also possible. Furthermore, the technology in this application applies to the heterogeneous network regardless whether different layers operate on the same carrier frequency as in the co-channel case, or on different carrier frequencies, or on a combination of these two cases. However the most stringent and practical scenario is that of the co-channel deployment. Although the description focuses on a macro BS and CSG HBS network with co-channel deployment, the technology in this application is applicable to other scenarios.

In the example scenario, it is likely that the MUE 150 served by the macro BS 110 with non-restricted access may operate close to the CSG HBS 130, as illustrated in FIG. 1. Due to restricted access, the MUE 150 may not be served by the CSG HBS 130 and may thus cause excessive uplink interference at the receiver of the CSG HBS.

Thus one aspect of the technology in this application is that the serving macro BS 110 determines or identifies the MUE 150 under its control that causes significant uplink interference (arrow 155) towards the neighboring CSG HBS 130. A second aspect is that upon determination of the dominant interfering MUE 150, the serving macro BS 110 takes specific actions, which lower the uplink interference at the HBS 130 emanating from such MUE 150.

The following three non-limiting embodiments are described in more details below in section 1-3:
1. The macro BS 110 obtains uplink received interference at the victim CSG HBS 130;
2. The macro BS 110 detects the interfering aggressor MUE 150;
3. The macro BS 110 reduces uplink interference in the victim CSG HBS 130 based on the obtained and/or detected uplink interference.

Section 1: Macro BS Obtaining Uplink Received Interference at CSG HBS

The obtained information about the uplink interference at the victim CSG HBS is used by the macro BS to determine the uplink interference received at the CSG HBS and to take appropriate actions as described below in section 2 and section 3, respectively.

The uplink received interference at the neighboring HBS may be obtained by exchanging such information over network interference e.g. over X2 in LTE.

However in a two layered macro BS and CSG HBS deployment scenario, the macro BSs are not directly connected to the CSG HBS, and no interface such as the X2 may thus be used. The communication between macro BS and CSG HBS via a core network involves complexity and delay. Such a backhaul communication may also be restricted in certain network implementations.

Therefore, according to this example embodiment, information about uplink received interference at the CSG HBS is obtained by the macro BS via the MUE under its control. A method for obtaining the uplink received interference at CSG HBS comprises the following:

1. The macro BS requesting the MUE to acquire a message or an indicator from the neighboring CSG HBS containing or depicting the uplink received interference at the CSG HBS, and also requesting the MUE to send the acquired message or indicator to its serving macro BS.
2. The CSG HBS:
   a. Determining the uplink received interference (e.g. received interference power), where the determining may be performed periodically or at any time either prior to or after adjusting the downlink maximum output power; and
   b. Signaling to the MUE via a dedicated channel or a common channel, a message or an indicator or a status flag relating to an uplink received interference. The message/indicator/status flag may contain or depict the determined uplink received interference, or may indicate that the interference level is above a certain threshold. A combination of depicting the actual interference and indicating that the interference is above a threshold is also an alternative.
3. The MUE:
   a. Receiving the message or the indicator or the status flag relating to the uplink received interference, and/or the downlink transmit power from the CSG HBS; and
   b. Sending the received message/indicator/status flag either transparently or non-transparently to the serving macro BS.

The signaling of a message or status flag may be done using any suitable higher layer (e.g. layer 3) or lower layer (e.g. layer 1 and layer 2) protocols. Examples of higher layer protocols are RRC or any Radio Resource Management (RRM) related protocol. Examples of lower layer protocols are Media Access Control (MAC) layer or any other Layer 1/Layer 2 protocol, e.g. over Physical Downlink Control Channel (PDCCH) in LTE. Lower layer signaling such as PDCCH is preferably used when the signaling overheads are small, e.g., if only an indicator is signaled. Otherwise higher layer signaling such as RRC should be used.

The message or an indicator sent in the form of higher layer signaling such as RRC can be sent to the UE via UE specific signaling or via common or cell specific signaling. The UE specific signal and cell specific signaling are mapped on the UE specific physical channel and common channel respectively. Examples of UE specific and common channel (i.e. cell specific) over which such signaling can be sent are the UE specific Physical Downlink Shared Channel (PDSCH) and the dedicated broadcast channel which is transmitted on the PDSCH in LTE.

Sending the message or indicator transparently means that the MUE retransmits the received information to the serving macro BS without reading or extracting it. In case of non-transparent transmission, the MUE decodes the received message or indicator and may do further processing before resending it to the serving macro BS.

Section 2: Macro BS Detecting the Interfering MUE

According to one example embodiment, the method in the macro BS for detecting or identifying the aggressor MUE interfering with the victim CSG HBS comprises the steps of:

Receiving a cell identifier, such as a Physical Cell identity (PCI), and downlink signal measurement reports such as signal strength or signal quality measurement reports for one or more neighboring cells from the MUE. The neighboring cells may or may not belong to the CSG HBS.

Requesting the MUE to report the Cell Global Identifier (CGI) of the neighbor cell if the reported signal strength or signal quality of a cell is above a threshold and the received cell identifier may belong to the CSG HBS.

Requesting (optionally) the MUE to report the power headroom or its uplink transmission power or any indicator or measurement which depicts its present transmission power level.

Obtaining (optionally) via the MUE a measure or an indicator depicting the uplink received interference at the neighboring HBS caused by the MUE, wherein the method of obtaining the measure or the indicator may be as described in section 1.

Obtaining (optionally) via MUE a measure or an indicator depicting the downlink transmit power, such as the BS Tx power, of the neighbouring HBS, wherein the measure or the indicator is acquired by the MUE by reading the HBS system information.

Determining either implicitly based on the MUE reports of e.g. signal strength, signal quality, and/or power headroom, or explicitly based on the MUE reported message, whether the total uplink received interference in CSG HBS is above a threshold, or whether the path loss between the said MUE and the CSG BS is below a threshold, or whether the uplink interference from the MUE to the CSG BS is above a threshold.

If the determined total uplink received interference at the CSG HBS is above the threshold, or if the determined uplink interference of a specific MUE to the CSG BS is above a threshold, or if a specific MUE is too close to the CSG BS and the path loss thus is small, then the macro BS lowers the interference by carrying out one or more actions as described in section 3 below.

Examples of downlink signal strength measurements are Reference Signal Received Power (RSRP) and Common Pilot Channel Received Signal Code Power (CPICH RSCP) in LTE and HSPA respectively. Examples of signal quality measurements are Reference Signal Received Quality (RSRQ) and CPICH Ec/No in LTE and HSPA respectively. In general the measurements may comprise any intra-frequency measurements or any inter-frequency or inter-RAT measurements or measurements on one or more component carriers in a multi-carrier system, also called a carrier aggregation (CA) system. In CA the component carriers may belong to the same RAT (intra-RAT or single RAT CA) or different RATs (inter-RAT or multi-RAT CA).

Examples of uplink interference measurements are noise Rise over Thermal (RoT) in LTE or HSPA or Received Interference Power (RIP) in LTE. The measurements may be done over a one or a group of channels, e.g., over a group of RBs in LTE.

The different thresholds used above may be pre-defined in the macro BS or may is be configurable by any other node, such as a Self Organizing Network (SON) node, an Operations Support System (OSS) node, an Operation and Maintenance node, and a network controller such as RNC or BSC. The thresholds may depend on or may be derived from one or more of the measurements acquired by the macro BS in one of the previous steps described above.

Section 3: Macro BS Reducing Uplink Interference in CSG HBS

If the uplink interference received at the neighboring victim HBS from the aggressor MUE, as determined by the macro BS based on the obtained information (see section 1)

and/or on detection (see section 2), is above a threshold, or the MUE is too close to the HBS and the path loss is below a threshold, or the uplink interference from the MUE is above a threshold, then a method in the macro BS for reducing the uplink interference in the CSG HBS is performed. The method comprises performing at least one of the following tasks for at least one MUE which reports a CGI that belongs to the CGS HBS:

Reducing the MUE maximum transmit uplink power below a threshold;

Reducing a target received signal value used for uplink power control. Examples of target received signal level set at the eNB in LTE are p0-UE-PUSCH and/or p0-UE-PUCCH. The p0-UE-PUSCH and p0-UE-PUCCH are the uplink target received power level for the Physical Uplink Shared Channel (PUSCH) and Physical Uplink Control Channel (PUCCH) respectively. PUSCH and PUCCH carry uplink data and control information respectively. Based on these target values the UE configures its uplink transmit power. Higher target results in higher uplink transmit power.

Configuring the uplink power control parameters based e.g. on the path loss information of at least one MUE such that its uplink interference to CSG HNB does not exceed a threshold;

Allocating limited number of physical channels. In one embodiment valid for an LTE network, a number of RB, where the number is below a certain threshold, is allocated;

Increasing the UE DRX cycle length in connected state;

Changing the UE RRC state of the UE from the connected state to the idle state or to any other lower activity state. An example of a low activity state for a UE in LTE and HSPA is an idle state. In the idle state the UE generally operates in long DRX cycles such as 1.28 s to enable UE battery saving. Examples of other lower activity states in HSPA are CELL_PCH, URA_PCH and CELL_FACH. The UE in an RRC connected state when configured in long DRX and/or long DTX cycle can also be regarded as operating in lower activity state in LTE and HSPA. Examples of short DRX cycles commonly used in connected state are: 10 ms, 40 ms and 80 ms. Examples of long DRX cycles which are commonly used in connected state are 640 ms, 1.28 s and 2.56 s. If the UE has been operating in the higher activity state such as in CELL_DCH state, the UE state can be changed to a lower activity state such as CELL_FACH state. Similarly if a UE is operating in connected state using short DRX cycle (e.g. 40 ms) then the DRX cycle can be extended from short DRX (i.e. 40 ms) to long DRX such as 640 ms or 1.28 s.

Scheduling the MUE when radio conditions are favorable in the corresponding cell of the macro BS (e.g. when the interference is below threshold and/or the channel quality is above threshold), requiring the MUE to transmit with relatively low output power while maintaining the target received signal quality;

Scheduling the MUE according to a pattern of assigned resources or physical channels, where the resources may be reserved on a persistent or semi-persistent basis for scheduling one MUE or a group of MUEs. Examples of physical channels or resources in HSPA are CDMA channelization codes and subframes/transmission time interval (TTI). Examples in LTE are RBs and subframes/TTI. A scheduling duration of a physical channel is at least one TTI.

Furthermore, when the uplink interference received at the neighboring CSG HBS as determined by the macro BS falls below a certain threshold, or after a specified time period (TO) the macro BS may restore the MUE parameter, the MUE activity state or the scheduling pattern to a default state or to normal level again.

In addition to the above described methods, the macro BS may further perform one or more of the following in particular embodiments:

Signaling to the CSG HBS the pattern of assigned resources, which may e.g. be a pattern of configured almost blank subframes, or the scheduling information of the MUEs, e.g., all MUEs or specific MUEs such as cell edge MUEs or MUEs with bad signal quality;

Signaling to the CSG HBS an indication of the presence of non-CSG MUEs in the close proximity of the CSG HBS. The presence may be indicated e.g. based on the estimated path loss of the MUE. If there are MUEs with path loss below a threshold, it may be indicated that there are non-CSG MUEs in the close proximity of the CSG HBS;

Signaling to the CSG HBS, an estimated uplink interference on CSG HBS from the non-CSG MUEs, where the estimation may be based on the obtained path loss information, the estimated uplink transmit power of MUEs, and the uplink scheduling information for MUEs. The uplink scheduling information may be, e.g., that the scheduling is according to a scheduling pattern. The estimated uplink interference at the HBS may be obtained from all or subset of the MUEs. The subset of MUEs could be those generating a dominant or major portion of the uplink interference.

Signaling to the CSG HBS a measure or an indication of whether the downlink interference for non-CSG MUEs is at an acceptable level.

The signaling to the CSG HBS may be implemented by using the macro BS to CSG HBS interface if available, e.g. the X2 interface in LTE, or backhaul links. Alternatively, the signaling may be performed by transmitting over the air interface in system information via a broadcast channel.

In response to the signaling by the macro BS, the CSG HBS may also perform one or more of the following actions, with the aim of efficiently dealing with and reducing the impact from the uplink received interference from the MUE:

Receiving the information about the assigned resource pattern, or the scheduling of resources used in the MN or the estimated uplink interference impact from MUEs, or the indication about MUEs in the close proximity of the CSG HBS, by means of backhaul communication or by reading the system information sent by the macro BS;

Configuring almost blank subframes, i.e. subframes with reduced power and/or reduced activity, and/or scheduling the HUE controlled by the HBS while taking into account the received scheduling pattern information of resources used in the macro BS. In one embodiment, the HUE may be scheduled using resources which are orthogonal to the resources used for scheduling the MUE in the macro BS.

Figure 2C:
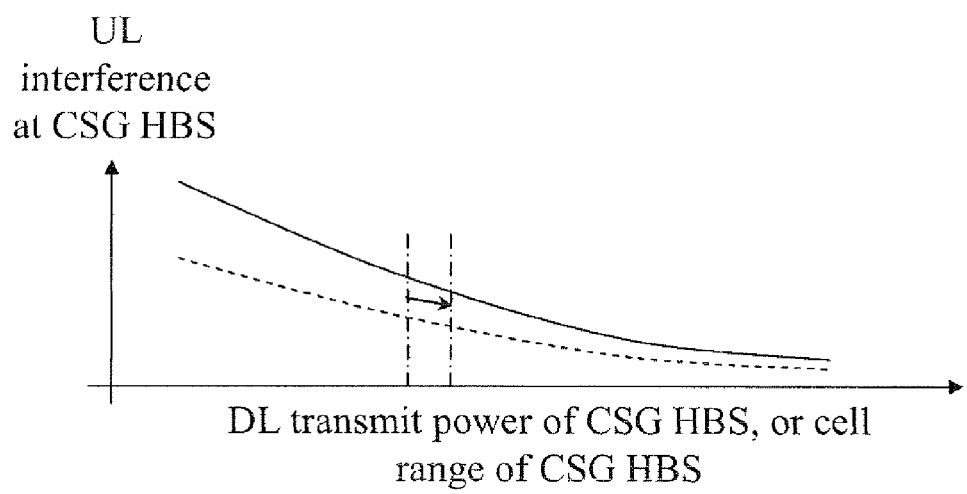

If the received estimated uplink interference impact of MUEs or the MUEs proximity indication indicate that the uplink interference from non-CSG MUEs is at an acceptable level and at the same time the total uplink interference is high, the CSG HBS cell may be too small and thus may need to be expanded to serve interfering UEs in neighbour cells. This may be performed either by controlling cell selection offsets or increasing the transmit power of CSG HBS as long as the downlink interference at non-CSG MUEs may be maintained at an acceptable level. If the received uplink interference from non-CSG MUEs at CSG HBS is still at a high level, the uplink interference needs further reduction using the methods described in the current disclosure. The relation between the downlink interference at non-CSG MUEs, uplink interference from non-CSG MUEs and the CSG HBS transmit power adjustment decisions is illustrated in FIGS. 2a-c. In FIG. 2a, the downlink interference at non-CSG MUEs is too high, and the CSG HBS power is thus adjusted downwards to reduce the downlink interference. In FIG. 2b, the uplink interference at the CSG HBS is too high, and the methods of the disclosure may be used to reduce the uplink interference from one or more MUEs. In FIG. 2c, the uplink interference from non-CSG MUEs is acceptable, but the uplink interference from neighbour cells is still too high, and the cell range may therefore be expanded as described above.

Figure 3A:
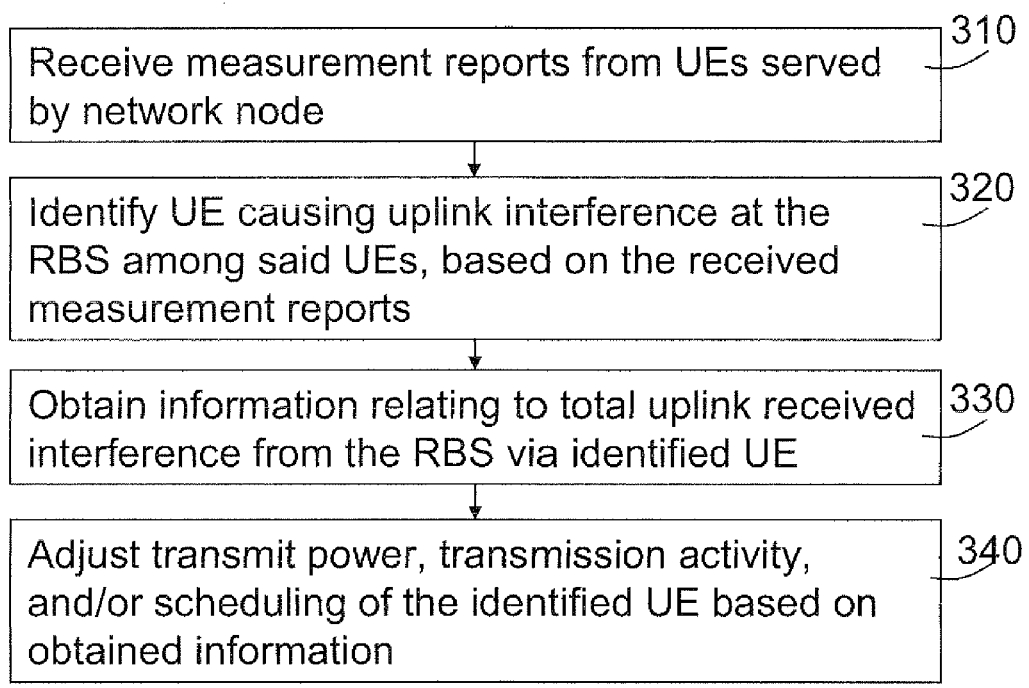
FIGS. 3a-b are flowcharts of the method in the network node according to embodiments.

FIG. 3a is a flowchart of a method in a network node, e.g. a macro BS, of a heterogeneous wireless communication system, for reducing uplink interference at a radio BS with restricted wireless access, according to a first embodiment. The uplink interference is caused by a UE served by the network node, wherein the UE has a restricted wireless access to the radio BS. The method comprises:

310: Receiving measurement reports from one or more UEs served by the network node.
 320: Identifying a UE causing uplink interference at the radio BS among said one or more UEs, based on the received measurement reports.
 330: Obtaining information relating to a total uplink received interference from the radio BS via the identified UE.
 340: Adjusting at least one of a transmit power, a transmission activity, and a scheduling of the identified UE based on the obtained information, such that the uplink interference caused by the identified UE is reduced.

In one embodiment, identifying 320 the UE comprises identifying the UE reporting a signal measurement exceeding a first threshold, where the signal measurement is associated with a neighbour cell identifier corresponding to the radio BS. The signal measurement may be either a received signal strength measurement, or a received signal quality measurement, or both.

Figure 3B:
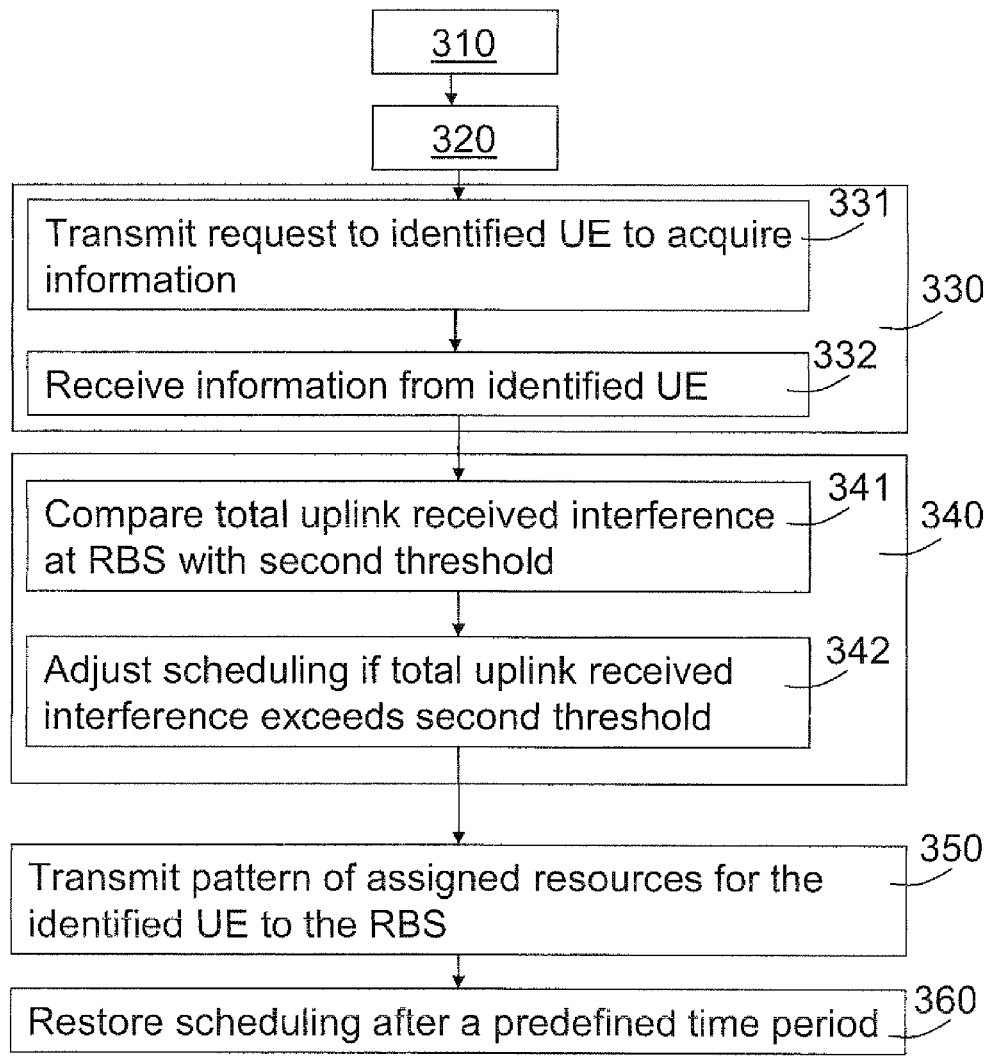

FIG. 3b is a flowchart of the method in the network node, according to a second embodiment. The receiving 310 and identifying 320 steps correspond to the steps described above with regards to the first embodiment. However, step 330 of obtaining information relating to the total uplink received interference at the radio BS comprises:

331: Transmitting a request to the identified UE to acquire the information from the radio BS.
 332: Receiving the information relating to the total uplink received interference at the radio BS from the identified UE, Furthermore, step 340 of adjusting comprises:

341: Comparing a total uplink received interference at the radio BS with a second threshold. The total uplink received interference is determined based on the obtained information and on the measurement report received from the identified UE.
 342: Adjusting at least one of the transmit power, the transmission activity, and the scheduling if said total uplink received interference exceeds the second threshold.

Step 340 of adjusting may alternatively or in addition to step 341 and 342 above comprise comparing a path loss between the identified UE and the radio BS with a third threshold, and adjusting at least one of the transmit power, the transmission activity, and the scheduling if said path loss is below the third threshold. The path loss is determined based on the retrieved information and on the measurement report received from the identified UE. In still another alternative embodiment, or in addition to either or both of the comparing and adjusting embodiments described above, the adjusting 340 may comprise comparing the uplink interference caused by the identified UE at the radio BS with a fourth threshold, and adjusting at least one of the transmit power, the transmission activity, and the scheduling if said uplink interference exceeds the fourth threshold. The uplink interference is also determined based on the retrieved information and on the measurement report received from the identified UE.

The method according to the second embodiment also comprises:

350: Transmitting a pattern of assigned resources or other scheduling information for the identified UE to the radio BS. As explained above, the HBS may then schedule its HUEs while taking into account the scheduling pattern information of resources used in the macro BS.
 360: Restoring at least one of the transmit power parameter, the transmission activity state, and the scheduling of the identified UE after a pre-defined time period or when the interference caused by the identified UE falls below an interference threshold. In this way, the UE may transmit according to the default values of the parameters again, when the interference is not a problem any more.

In both the first and second embodiments described above, the method in the network node may further comprise obtaining information relating to a UE transmit power from the identified UE. If the network node obtains this information, the adjusting 340 may be based also on the obtained information relating to the UE transmit power level. Furthermore, the method may optionally also comprise obtaining information relating to a radio BS transmit power from the radio BS via the identified UE. In this case the adjusting 340 may be based also on the obtained information relating to the radio BS transmit power level.

In particular embodiments, the adjusting 340 of at least one of the transmit power, the transmission activity, and the scheduling comprises at least one of the following:

reducing a maximum transmit uplink power of the identified UE;
 reducing a target value of an uplink signal for an uplink power control parameter of the identified UE;
 configuring an uplink power control parameter of the identified UE such that the uplink interference caused by the identified UE at the radio BS goes below a fourth threshold;
 allocating a number of physical channels for transmission to the identified UE, said number being below a pre-determined number;
 increasing a discontinuous reception, DRX, cycle length of the identified UE, such that the reception activity of the signal of the identified UE is lowered;
 lowering the transmission activity of the identified UE, such that the transmission activity of the signal of the identified UE is lowered;
 scheduling the identified UE when radio conditions are favourable, such that the transmission output power of the identified UE is lowered; and
 scheduling the identified UE according to a pattern of assigned resources.

Figure 4A:
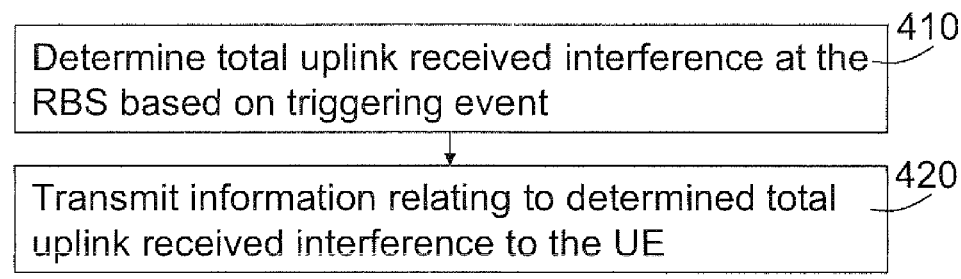
FIGS. 4a-b are flowcharts of the method in the radio BS according to embodiments.

FIG. 4a is a flowchart of a method in a radio BS with restricted wireless access of a heterogeneous wireless communication system, for supporting a reduction of uplink interference at the radio BS caused by a UE served by a network node of the wireless communication system, according to embodiments. The UE has a restricted wireless access to the radio BS. The method comprises:

- 410: Determining a total uplink received interference at the radio BS based on a triggering event. The triggering event may be a periodically occurring event and/or an adjustment of a downlink maximal transmit power of the radio BS.
- 420: Transmitting information relating to the determined total uplink received interference to the UE, to support the reduction of uplink interference performed by the network node.

Figure 4B:
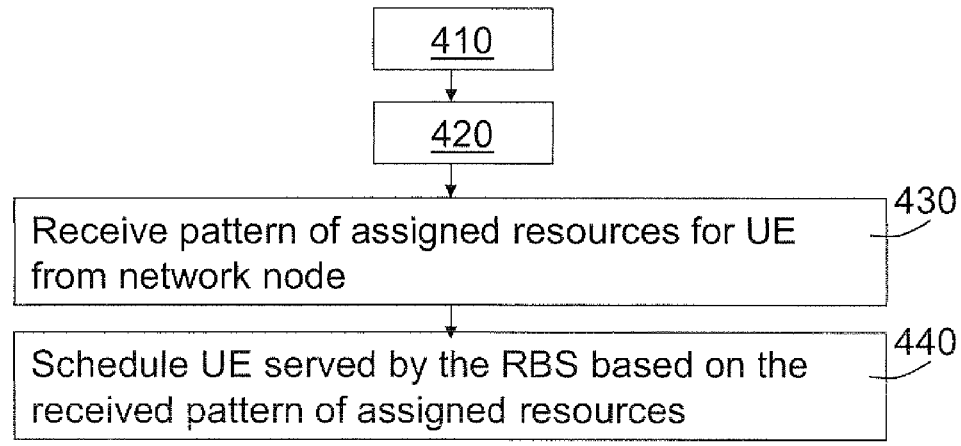

FIG. 4b is a flowchart of the method in the radio BS, according to another embodiment. In addition to the steps of determining the total uplink received interference 410 and transmitting 420 the information to the UE, the method further comprises:

- 430: Receiving a pattern of assigned resources or other scheduling information for the UE from the network node.
- 440: Scheduling a UE served by the radio BS based on the received pattern of assigned resources, to support the reduction of uplink interference.

Figure 5A:
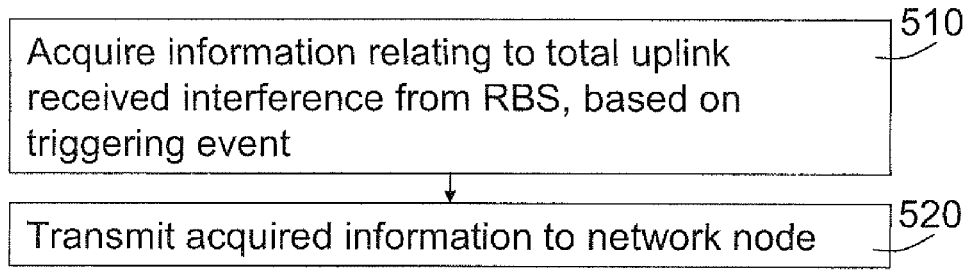
FIGS. 5a-b are flowcharts of the method in the UE according to embodiments.

FIG. 5a is a flowchart of a method in a UE of a wireless communication system, for supporting a reduction of uplink interference caused by the UE at a radio BS with restricted wireless access of the wireless communication system, according to embodiments. The UE is served by a network node of the wireless communication system and has a restricted wireless access to the radio BS. The method comprises:

- 510: Acquiring information relating to a total uplink received interference from the radio BS based on a triggering event.
- 520: Transmitting the acquired information to the network node, to support the reduction of uplink interference performed by the network node.

Figure 5B:
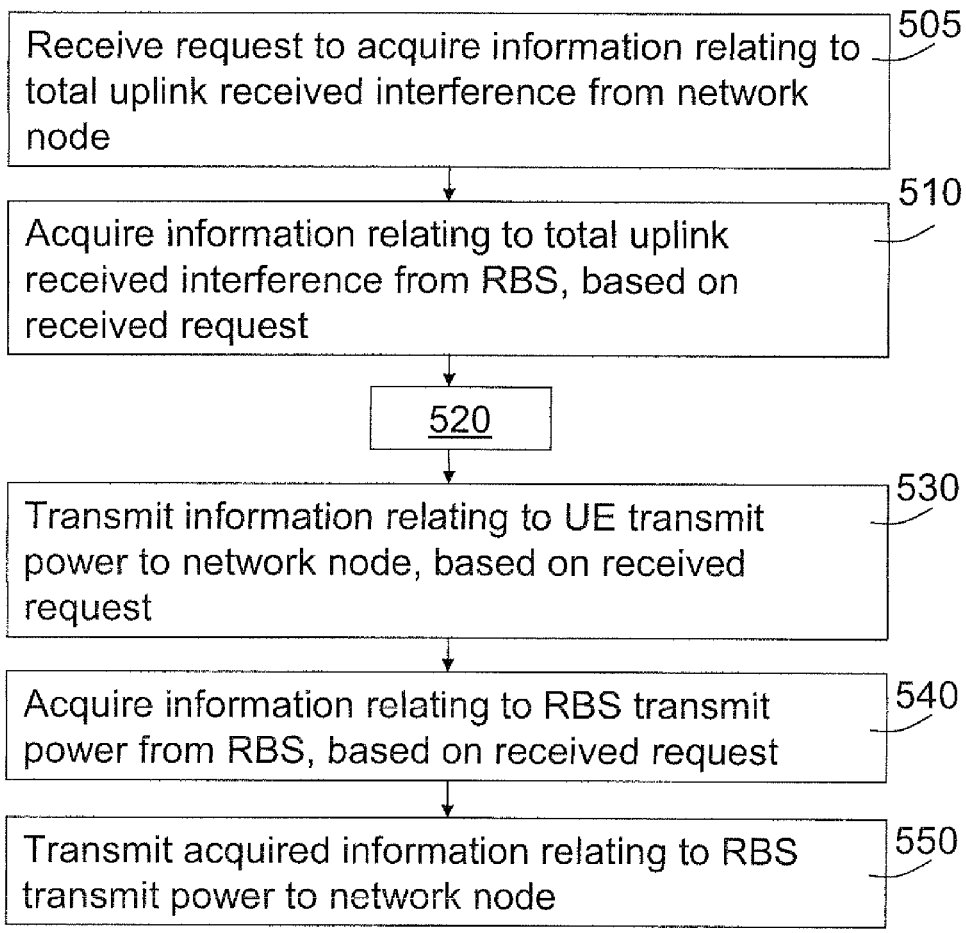

FIG. 5b is a flowchart of the method in the UE, according to another embodiment, wherein the method comprises the initial step of receiving 505 a request from the network node to acquire the information relating to the total uplink received interference from the radio BS. In this case the received request is the triggering event for acquiring the information in step 510, as already described in previous embodiments. The method further comprises:

- 530: Transmitting information relating to a UE transmit power to the network node based on the triggering event, to support the reduction of uplink interference performed by the network node.
- 540: Acquiring information relating to a radio BS transmit power from the radio BS based on the triggering event.
- 550: Transmitting the acquired information relating to the radio BS transmit power to the network node, to support the reduction of uplink interference performed by the network node.

Figure 6A:
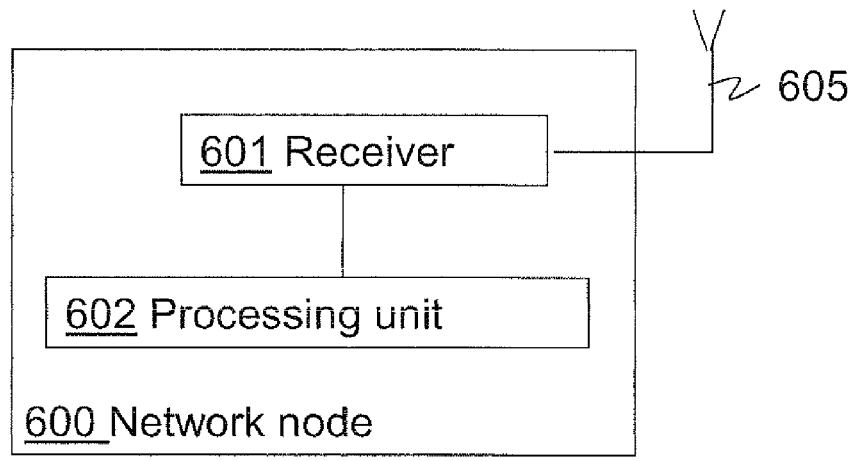
FIGS. 6a-f are block diagrams schematically illustrating a network node, a radio BS and a UE according to embodiments.

The network node 600 is schematically illustrated in FIG. 6a, according to embodiments. The network node 600 is configured to be used in a heterogeneous wireless communication system, and to reduce uplink interference at a radio BS 630 with restricted wireless access, when the uplink interference is caused by a UE 650 served by the network node 600, and the UE 650 has a restricted wireless access to the radio BS 630. The network node 600 comprises a receiver 601 configured to receive measurement reports from one or more UEs served by the network node, and a processing unit 602. In one embodiment the receiver 601 may be using one or more antennas 608 for the reception, The processing unit 602 is configured to:

identify a UE causing uplink interference at the radio BS among said one or more UEs, based on the received measurement reports, obtain information relating to a total uplink received interference from the radio BS via the identified UE, and adjust at least one of a transmit power, a transmission activity, and a scheduling of the identified UE based on the obtained information, such that the uplink interference caused by the identified UE is reduced.

In embodiments, the processing unit 602 is configured to identify the UE reporting a signal measurement exceeding a first threshold, where the signal measurement is associated with a neighbour cell identifier corresponding to the radio BS. The signal measurement may be a received signal strength measurement and/or a received signal quality measurement.

The processing unit 602 may also be configured to obtain information relating to the total uplink received interference from the radio BS via the identified UE, by transmitting a request to the identified UE to acquire the information from the radio BS, and by receiving the information from the identified UE.

In another embodiment, the processing unit 602 is further configured to obtain information relating to a UE transmit power from the identified UE, and to adjust the at least one of the transmit power, the transmission activity, and the scheduling of the identified UE based also on the obtained information relating to the UE transmit power level.

In still another embodiment, the processing unit 602 is further configured to obtain information relating to a radio BS transmit power from the radio BS via the identified UE, and to adjust the at least one of the transmit power, the transmission activity, and the scheduling of the identified UE based also on the obtained information relating to the radio BS transmit power level.

In one embodiment, the processing unit 602 is further configured to compare a total uplink received interference at the radio BS with a second threshold, and adjust the at least one of the transmit power, the transmission activity, and the scheduling if said total uplink received interference exceeds the second threshold. The total uplink received interference is determined based on the obtained information and on the measurement report received from the identified UE. In another embodiment the processing unit 602 is further configured to compare a path loss between the identified UE and the radio BS with a third threshold, and to adjust the at least one of the transmit power, the transmission activity, and the scheduling if said path loss is below the third threshold. The path loss is determined based on the retrieved information and on the measurement report received from the identified UE. The processing unit 602 may also be configured to compare the uplink interference caused by the identified UE at the radio BS with a fourth threshold, and adjust the at least one of the transmit power, the transmission activity, and the scheduling if said uplink interference exceeds the fourth threshold. The uplink interference is determined based on the retrieved information and on the measurement report received from the identified UE.

In embodiments, the processing unit 602 is further configured to adjust the at least one of the transmit power, the transmission activity, and the scheduling by performing at least one of the following:

reduction of a maximum transmit uplink power of the identified UE;

reduction of a target value of an uplink signal for an uplink power control parameter of the identified UE;

configuration of an uplink power control parameter of the identified UE such that the uplink interference caused by the identified UE at the radio BS goes below a fourth threshold;

allocation of a number of physical channels for transmission to the identified UE, said number being below a pre-determined number;

increase of a discontinuous reception, DRX, cycle length of the identified UE, such that the reception activity of the signal of the identified UE is lowered;

lowering of the transmission activity of the identified UE, such that the transmission activity of the signal of the identified UE is lowered;

scheduling of the identified UE at favourable radio conditions, such that the transmission output power of the identified UE is lowered; and scheduling of the identified UE according to a pattern of assigned resources.

When the scheduling is adjusted according to one embodiment, the processing unit 602 may be further configured to transmit the pattern of assigned resources or other scheduling information for the identified UE to the radio BS.

The processing unit 602 may be further configured to restore the at least one of the transmit power parameter, the transmission activity state, and the scheduling of the identified UE after a pre-defined time period or when the interference caused by the identified UE falls below an interference threshold.

Figure 6B:
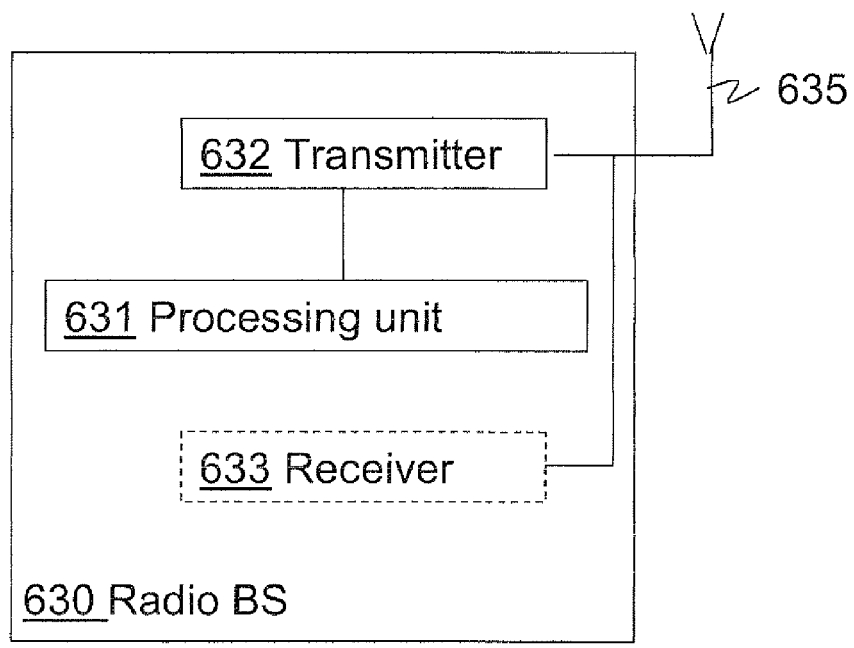

The radio BS 630 is schematically illustrated in FIG. 6b, according to embodiments. The radio BS 630 with restricted wireless access is configured to be used in a heterogeneous wireless communication system, and to support a reduction of uplink interference at the radio BS caused by a UE 650 served by a network node 600 of the wireless communication system. The UE 650 has a restricted wireless access to the radio BS. The radio BS comprises a processing unit 631 configured to determine a total uplink received interference at the radio BS based on a triggering event. The triggering event may be a periodically occurring event and/or an adjustment of a downlink maximal transmit power of the radio BS. The radio BS also comprises a transmitter 632 for transmitting information relating to the determined total uplink received interference to the UE, to support the reduction of uplink interference performed by the network node. In one embodiment the transmitter 632 may be using one or more antennas 638 for the transmission.

In particular embodiments, the radio BS further comprises a receiver 633 for receiving a pattern of assigned resources or other scheduling information for the UE from the network node. The processing unit 631 is then further configured to schedule a UE served by the radio BS based on the received pattern of assigned resources, to support the reduction of uplink interference.

Figure 6C:
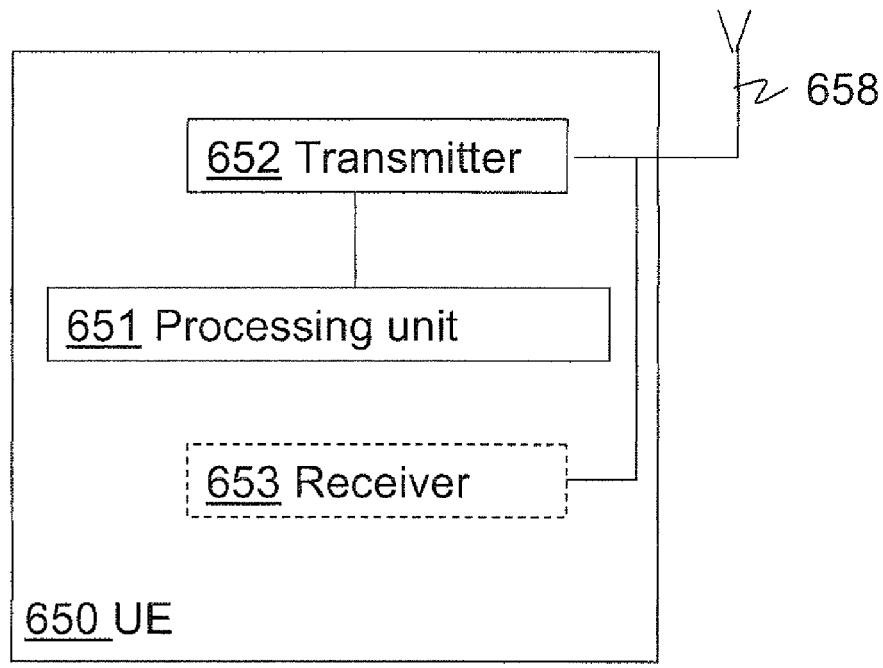

A UE 650 is schematically illustrated in FIG. 6c, according to embodiments. The UE 650 is configured to be used in a wireless communication system, and to support a reduction of uplink interference caused by the UE 650 at a radio BS 630 with restricted wireless access of the wireless communication system. The UE 650 is configured to be served by a network node of the wireless communication system and to have a restricted wireless access to the radio BS. The UE 650 comprises a processing unit 651 configured to acquire information relating to a total uplink received interference from the radio BS 630 based on a triggering event. It also comprises a transmitter 652 configured to transmit the acquired information to the network node, to support the reduction of uplink interference performed by the network node. In one embodiment the transmitter 652 may be using one or more antennas 658 for the transmission.

In embodiments, the UE 650 further comprises a receiver 653 for receiving a request from the network node to acquire said information relating to the total uplink received interference from the radio BS, wherein the received request is the triggering event. The transmitter 652 may be further configured to transmit information relating to a UE transmit power to the network node, to support the reduction of uplink interference performed by the network node. Furthermore, the processing unit 651 may be further configured to acquire information relating to a radio BS transmit power from the radio BS based on the triggering event, and the transmitter 652 may be configured to transmit the acquired information relating to the radio BS transmit power to the network node, to support the reduction of uplink interference performed by the network node.

Figure 6D:
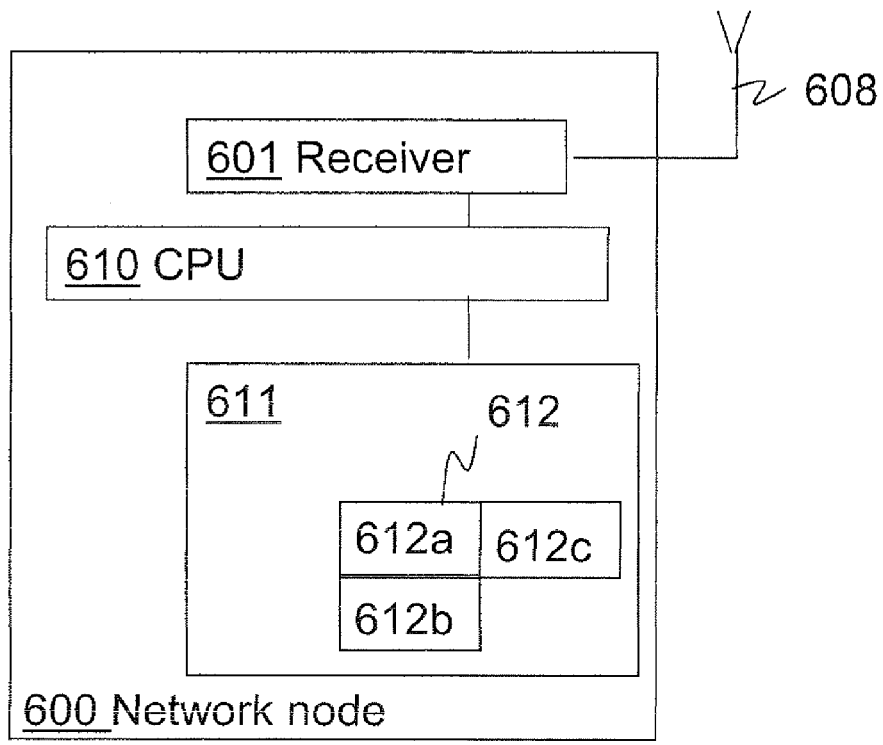
Figure 6E:
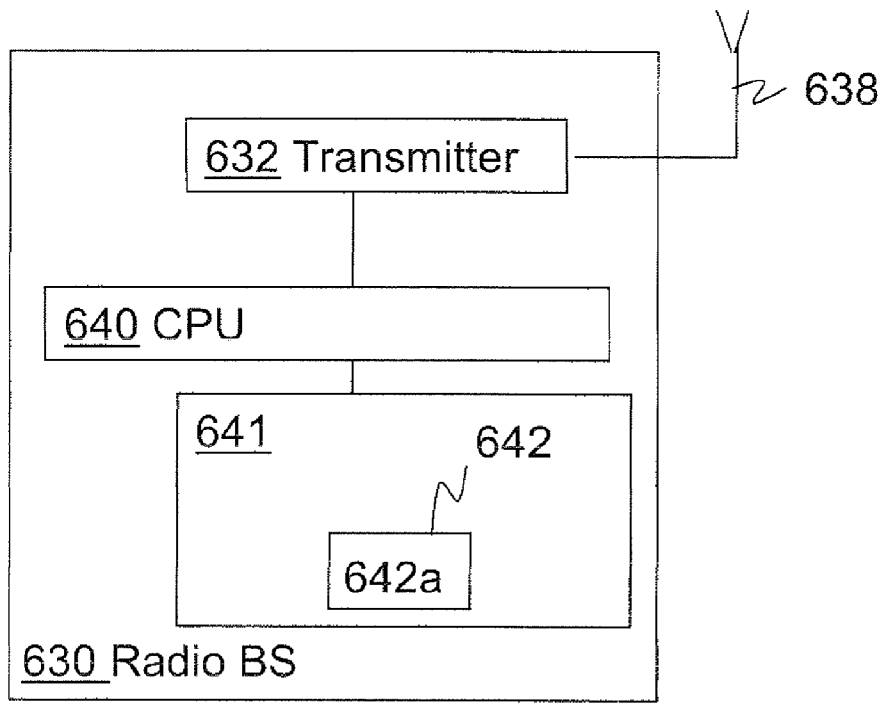
Figure 6F:
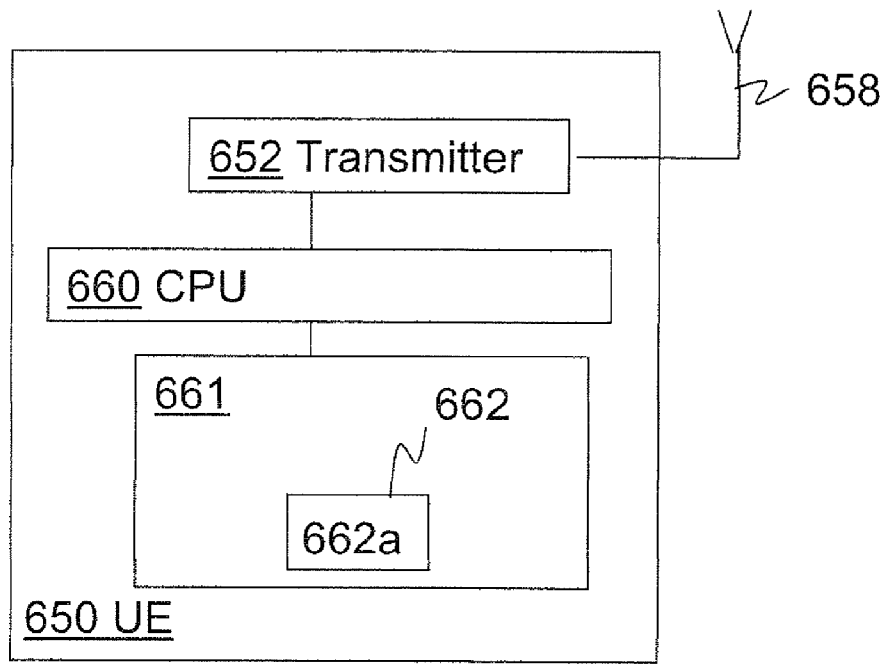

FIG. 6d-f schematically illustrate embodiments of the network node 600, the radio BS 630 and the UE 650 respectively, which are alternative ways of disclosing the embodiments illustrated in FIG. 6a-c.

In FIG. 6d, the network node 600 comprises the receiver 601 already described above, and a CPU 610 which may be a single unit or a plurality of units.

Furthermore, the network node 600 comprises at least one computer program product 611 in the form of a non-volatile memory, e.g. an EEPROM (Electrically Erasable Programmable Read-Only Memory), a flash memory or a disk drive. The computer program product 611 comprises a computer program 612, which comprises code means which when run on the network node 600 causes the CPU 610 on the network node 600 to perform the steps of the procedures described earlier in conjunction with FIG. 3a. Hence in the embodiments described, the code means in the computer program 612 of the network node 600 comprises an identifying module 612a for identifying an interfering UE, an obtaining module 612b for obtaining information relating to a total uplink received interference via the identified UE, and an adjusting module 612c for adjusting transmit power, transmission activity and/or scheduling of the UE. The code means may thus be implemented as computer program code structured in computer program modules. The modules 612a-c essentially perform the steps 320, 330 and 340 of the flow in FIG. 3a to emulate the network node described in FIG. 6a.

Similarly, in FIG. 6e, the radio BS 630 comprises, except for the transmitter 632 already described above, a CPU 640 which may be a single unit or a plurality of units. Furthermore, the radio BS 630 comprises at least one computer program product 641 in the form of a non-volatile memory, e.g. an EEPROM (Electrically Erasable Programmable Read-Only Memory), a flash memory or a disk drive. The computer program product 641 comprises a computer program 642, which comprises code means which when run on the radio BS 630 causes the CPU 640 on the radio BS 630 to perform the steps of the procedures described earlier in conjunction with FIG. 4a. Hence in the embodiments described, the code means in the computer program 642 of the radio BS 630 comprises a determining module 642a for determining the total uplink received interference at the radio BS. The code means may thus be implemented as computer program code structured in a computer program module. The module 642a essentially performs the step 420 of the flow in FIG. 4a to emulate the network node described in FIG. 6b.

In FIG. 6e, also the UE 650 comprises, except for the transmitter 652 already described above, a CPU 660 which may be a single unit or a plurality of units.

Furthermore, the UE 650 comprises at least one computer program product 661 in the form of a non-volatile memory, e.g. an EEPROM (Electrically Erasable Programmable Read-Only Memory), a flash memory or a disk drive. The computer program product 661 comprises a computer program 662, which comprises code means which when run on the UE 650 causes the CPU 660 on the UE 650 to perform the steps of the procedures described earlier in conjunction with FIG. 5a. Hence in the embodiments described, the code means in the computer program 662 of the UE 650 comprises an acquiring module 662a for acquiring information relating to the total uplink received interference from the radio BS. The code means may thus be implemented as computer program code structured in computer program modules. The module 662a essentially performs the step 510 of the flow in FIG. 5a to emulate the network node described in FIG. 6c.

Although the code means in the embodiment disclosed above in conjunction with FIGS. 6d-f are implemented as computer program modules which when run on causes the nodes to perform the steps described above in conjunction with FIGS. 6a-c, one or more of the code means may in alternative embodiments be implemented at least partly as hardware circuits.

Figure 7A:
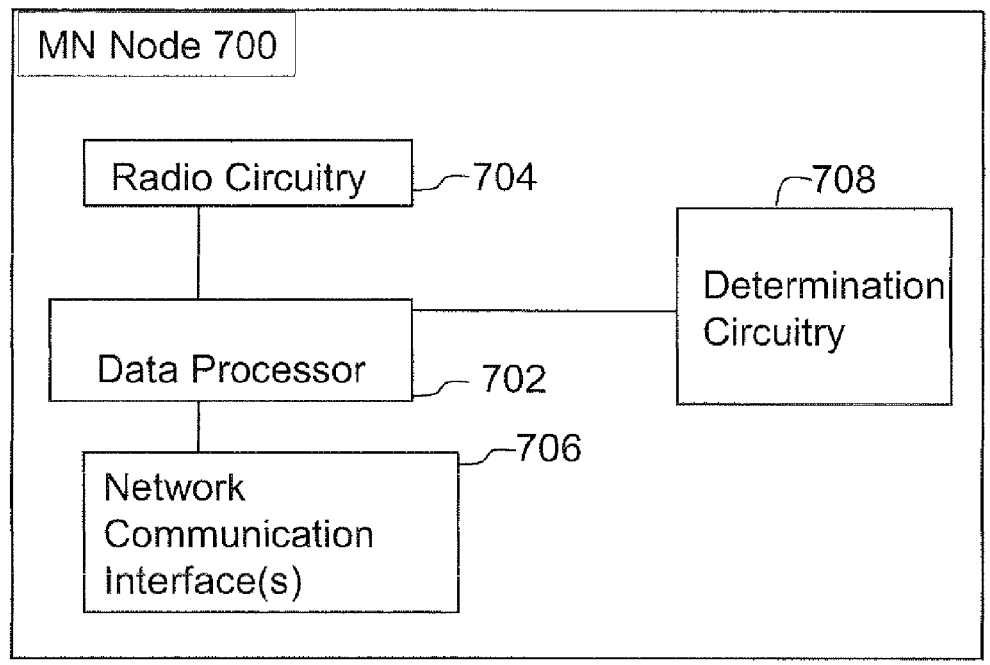
FIGS. 7a-c are block diagrams schematically illustrating a macro network node, a CSG HBS and a UE according to embodiments.

FIG. 7a is a non-limiting example function block diagram of an MN 700 that may be used to implement operations described above. A data processor 702 controls overall operation of the MN 700. The MN 700 includes radio communications circuitry 704. The data processor 702 connects to one or more network communication interface(s) 706 and circuitry 708 for determining the uplink interference at the victim HBS. The functions of circuitry 708 may alternatively be performed by the data processor 702.

Figure 7B:
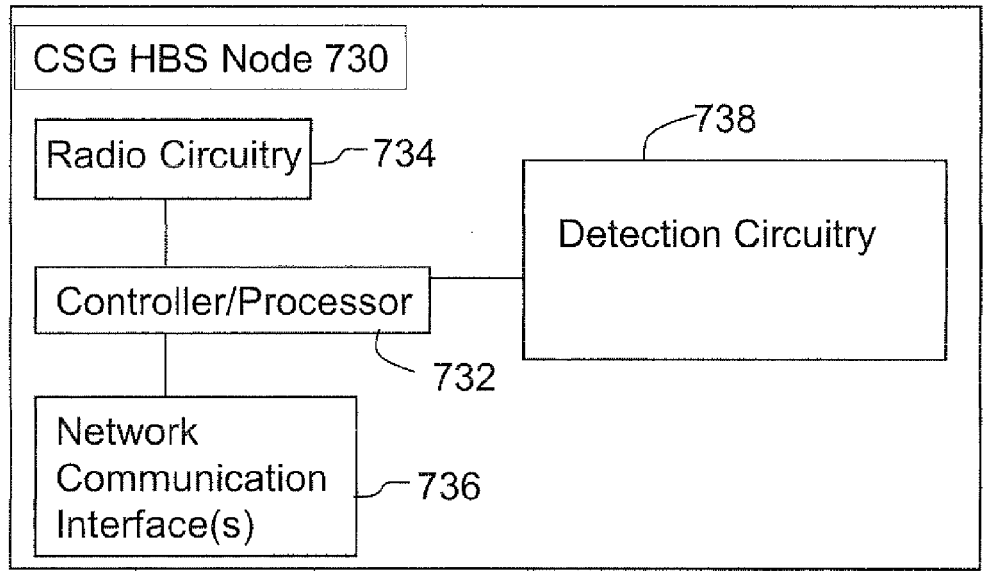

FIG. 7b is a non-limiting example function block diagram of a CSG HBS node 730 that may be used to implement operations described above. A data processor 732 controls overall operation of the CSG HBS node 730. The CSG HBS node 732 includes radio communications circuitry 734. The data processor 732 connects to one or more network communication interface(s) 736 and to received uplink interference detection circuitry 738. The received uplink interference detection circuitry 738 functions as described above may be performed by the controller/processor 732.

Figure 7C:
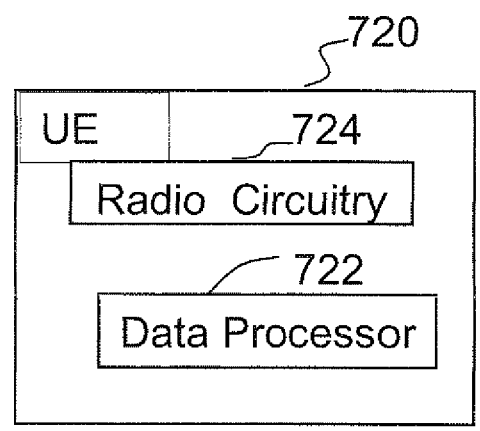

FIG. 7c is a function block diagram of a UE node that may be used to implement UE-related operations described above. The UE 720 includes a data processor 722 that controls the overall operation of the UE and is coupled to radio circuitry 724 for making and receiving radio communications. Data processor 722 receives messages from and sends messages to the MN via the radio circuitry as well as from and to the HBS.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

ABBREVIATIONS

3GPP 3$^{rd}$ Generation Partnership Project
BS Base Station
BSC Base station controller
BTS Base Transceiver Station
CDMA Code Division Multiple Access
CSG Closed Subscriber Group
eICIC enhanced Inter Cell Interference Coordination
eNodeB evolved NodeB
E-UTRAN Evolved UTRAN
HBS Home BS
HSPA High speed packet access
HUE Home UE (served by HBS)
LTE Long-Term Evolution
MAC Medium Access Control
MME Mobility management entity
MN Macro node (e.g. macro BS)
MUE Macro UE (served by macro node)
OFDM Orthogonal Frequency Division Modulation
OFDMA Orthogonal Frequency Division Multiple Access
OSS Operational Support Systems
PUCCH Physical Uplink Control Channel
PUSCH Physical Uplink Shared Channel
PDCCH Physical downlink control channel
PDSCH Physical downlink shared channel
QoS Quality of Service
RAN Radio Access Network
RNC Radio link controller
RRC Radio Resource Control
RSRP Reference Signal Received Power
RSRQ Reference Signal Received Quality
SON Self Organizing Network
UE User Equipment
UMTS Universal Mobile Telecommunications System
UTRAN Universal Terrestrial RAN
WCDMA Wide band code division multiple access

The invention claimed is:

1. A method in a network node of a heterogeneous wireless communication system, for reducing uplink interference at a radio base station with restricted wireless access, the uplink interference being caused by a user equipment served by the network node, wherein the user equipment has a restricted wireless access to the radio base station, the method comprising:

receiving measurement reports from one or more user equipments served by the network node, identifying a user equipment causing uplink interference at the radio base station among said one or more user equipments, based on the received measurement reports, obtaining information relating to a total uplink received interference from the radio base station via the identified user equipment;

adjusting at least one of a transmit power, a transmission activity, and a scheduling of the identified user equipment based on the obtained information, such that the uplink interference caused by the identified user equipment is reduced, wherein obtaining information relating to the total uplink received interference comprises:

transmitting a request to the identified user equipment to acquire said information from the radio base station when a signal measurement exceeds a first threshold, and receiving said information from the identified user equipment, wherein the signal measurement is associated with the neighbour cell identifier corresponding to the radio base station, and is at least one of a received signal strength measurement and a received signal quality measurement from the measurement reports; and measurement reports; and wherein adjusting comprises:
comparing the total uplink received interference at the radio base station with a second threshold, said total uplink received interference being determined based on the obtained information and on the measurement reports received from the identified user equipment, and
adjusting at least one of the transmit power, the transmission activity, and the scheduling if said total uplink received interference exceeds the second threshold.

2. The method according to claim 1, further comprising:
obtaining information relating to a user equipment transmit power level from the identified user equipment, and
wherein adjusting is based also on the obtained information relating to the user equipment transmit power level.

3. The method according to claim 1, further comprising obtaining information relating to a radio base station transmit power from the radio base station via the identified user equipment, and
wherein adjusting is based also on the obtained information relating to the radio base station transmit power level.

4. The method according to claim 1, wherein adjusting further comprises:
comparing the uplink interference caused by the identifier user equipment at the radio base station with a third threshold, the uplink interference caused by the identified user equipment at the radio base station being determined based on the obtained information and on the measurement reports received from the identified user equipment, and
adjusting at least one of the transmit power, the transmission activity, and the scheduling if the uplink interference caused by the identifier user equipment at the radio base station exceeds the third threshold.

5. The method according to claim 1, wherein adjusting further comprises:
comparing a path loss between the identified user equipment and the radio base station with a fourth threshold, said path loss being determined based on the obtained information and on the measurement reports received from the identified user equipment, and
adjusting at least one of the transmit power, the transmission activity, and the scheduling if said path loss is below the fourth threshold.

6. The method according to claim 1, wherein adjusting at least one of the transmit power, the transmission activity, and the scheduling comprises at least one of the following:
reducing a maximum transmit uplink power of the identified user equipment;
reducing a target value of an uplink signal for an uplink power control parameter of the identified user equipment;
configuring an uplink power control parameter of the identified user equipment such that the uplink interference caused by the identified user equipment at the radio base station goes below a fifth threshold;
allocating a number of physical channels for transmission to the identified user equipment, said number of physical channels being below a pre-determined number;
increasing a discontinuous reception, DRX, cycle length of the identified user equipment, such that reception activity of the signal of the identified user equipment is lowered;
lowering the transmission activity of the identified user equipment, such that the transmission activity of the signal of the identified user equipment is lowered;
scheduling the identified user equipment when radio conditions are favourable, such that transmission output power of the identified user equipment is lowered; and
scheduling the identified user equipment according to a pattern of assigned resources.

7. The method according to claim 6, further comprising:
transmitting the pattern of assigned resources or other scheduling information for the identified user equipment to the radio base station.

8. The method according to claim 1 further comprising:
restoring at least one of the transmit power parameter, the transmission activity, and the scheduling of the identified user equipment after a pre-defined time period or when the interference caused by the identified user equipment falls below an interference threshold.

9. A network node configured to be used in a heterogeneous wireless communication system, and to reduce uplink interference at a radio base station with restricted wireless access, the uplink interference being caused by a user equipment served by the network node, the user equipment having a restricted wireless access to the radio base station, the network node comprising a receiver configured to receive measurement reports from one or more user equipments served by the network node, and a processing unit configured to:
identify a user equipment causing uplink interference at the radio base station among said one or more user equipments, based on the received measurement reports,
obtain information relating to a total uplink received interference from the radio base station via the identified user equipment,
adjust at least one of a transmit power, a transmission activity, and a scheduling of the identified user equipment based on the obtained information, such that the uplink interference caused by the identified user equipment is reduced,
wherein the processing unit is configured to obtain information relating to the total uplink received interference from the radio base station via the identified user equipment by transmitting a request to the identified user equipment to acquire said information from the radio base station when a signal measurement exceeds a first threshold, and by receiving said information from the identified user equipment,
wherein the signal measurement is associated with a neighbour cell identifier corresponding to the radio base station, and is at least one of a received signal strength measurement and a received signal quality measurement from the measurement reports; and
wherein the processing unit is further configured to:
compare the total uplink received interference at the radio base station with a second threshold, said total uplink received interference being determined based on the obtained information and on the measurement reports received from the identified user equipment, and
adjust at least one of the transmit power, the transmission activity, and the scheduling is said total uplink received interference exceeds the second threshold.

10. The network node according to claim 9, wherein the processing unit is further configured to obtain information relating to a user equipment transmit power from the identified user equipment, and to adjust the at least one of the transmit power, the transmission activity, and the scheduling of the identified user equipment based also on the obtained information relating to the user equipment transmit power level.

11. The network node according to claim 9, wherein the processing unit is further configured to:

obtain information relating to a radio base station transmit power level from the radio base station via the identified user equipment, and adjust the at least one of the transmit power, the transmission activity, and the scheduling of the identified user equipment based also on the obtained information relating to the radio base station transmit power level.

12. The network node according to claim 9, wherein the processing unit is further configured to:

compare the uplink interference caused by the identified user equipment at the radio base station with a third threshold, the uplink interference caused by the identified user equipment at the radio base station being determined based on the obtained information and on the measurement reports received from the identified user equipment, and adjust the at least one of the transmit power, the transmission activity, and the scheduling if the uplink interference caused by the identified user equipment at the radio base station exceeds the third threshold.

13. The network node according to claim 9, wherein the processing unit is further configured to:

compare a path loss between the identified user equipment and the radio base station with a fourth threshold, said path loss being determined based on the obtained information and on the measurement report received from the identified user equipment, and adjust the at least one of the transmit power, the transmission activity, and the scheduling if said path loss is below the fourth threshold.

14. The network node according to claim 9, wherein the processing unit is further configured to adjust the at least one of the transmit power, the transmission activity, and the scheduling by performing at least one of the following:

reduction of a maximum transmit uplink power of the identified user equipment;

reduction of a target value of an uplink signal for an uplink power control parameter of the identified user equipment;

configuration of an uplink power control parameter of the identified user equipment such that the uplink interference caused by the identified user equipment at the radio base station goes below a fifth threshold;

allocation of a number of physical of physical channels being below a pre-determined number;

increase of a discontinuous reception, DRX, cycle length of the identified user equipment, such that reception activity of the signal of the identified user equipment is lowered;

lowering of the transmission activity of the identified user equipment, such that the transmission activity of the signal of the identified user equipment is lowered;

scheduling of the identified user equipment at favourable radio conditions, such that transmission output power of the identified user equipment is lowered; and scheduling of the identified user equipment according to a pattern of assigned resources.

15. The network node according to claim 14, wherein the processing unit is further configured to transmit the pattern of assigned resources or other scheduling information for the identified user equipment to the radio base station.

16. The network node according to claim 9, wherein the processing unit is further configured to restore the at least one of the transmit power parameter, the transmission activity state, and the scheduling of the identified user equipment after a pre-defined time period or when the interference caused by the identified user equipment falls below an interference threshold.

\* \* \* \* \*